2,180,867

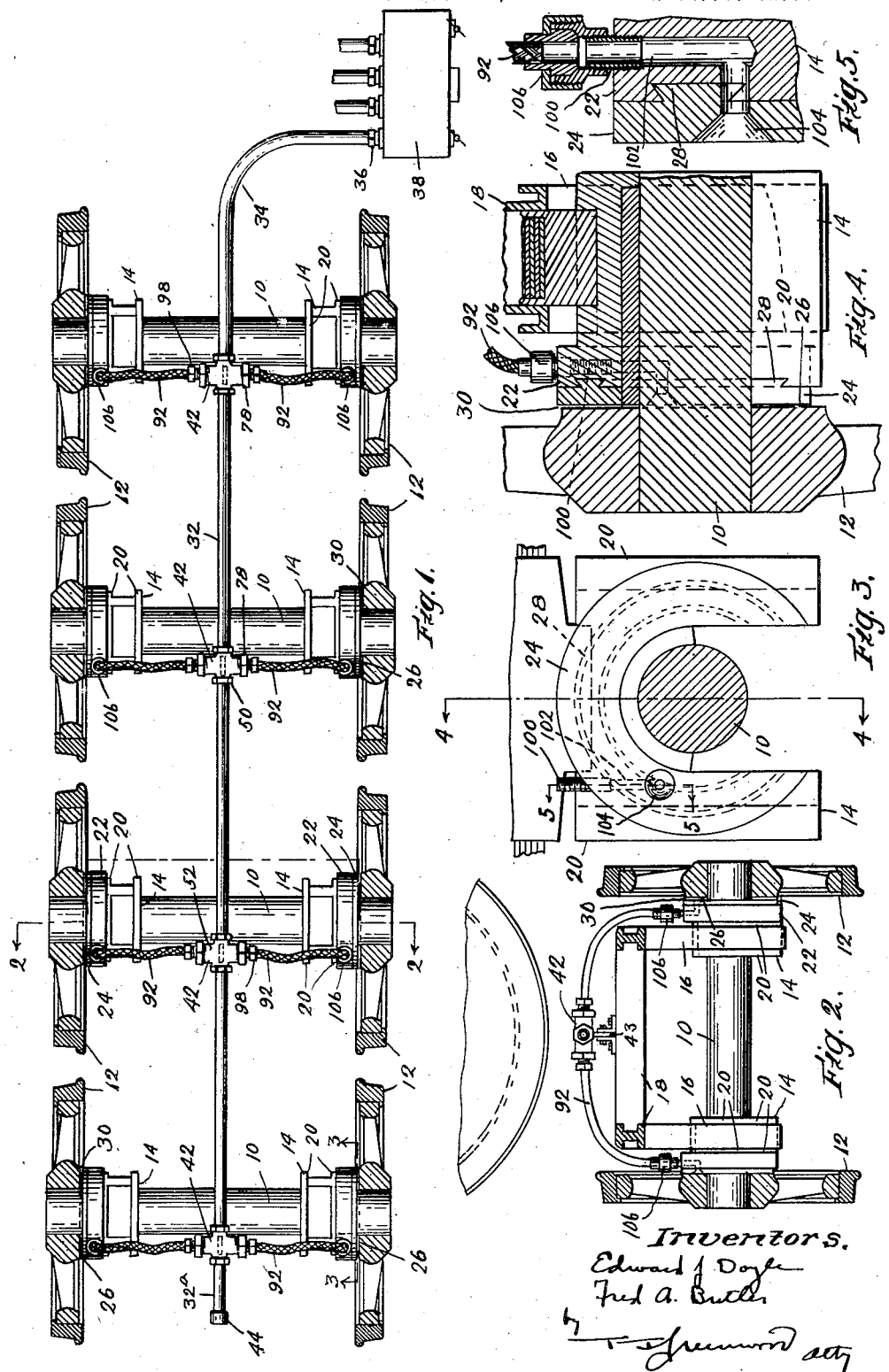

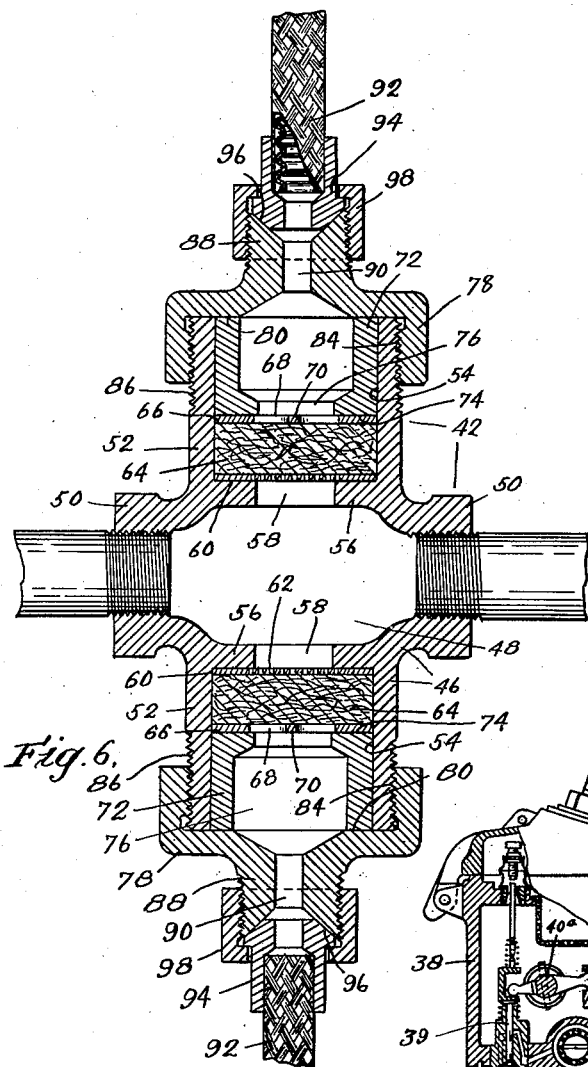
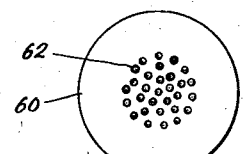
Fig. 7.
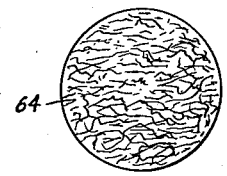
Fig. 8.
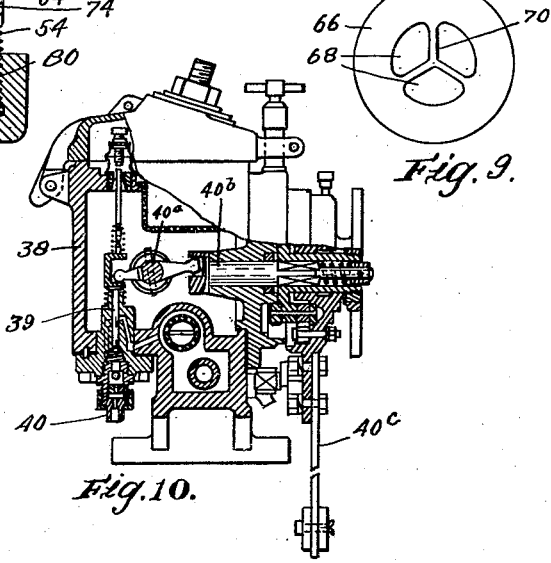
Inventors,
Edward J. Doyle
Fred A. Butler
by ——— Drummond atty Patented Nov. 21, 1939

UNITED STATES PATENT OFFICE 2,180,867

LOCOMOTIVE LUBRICATING SYSTEM AND APPARATUS

Edward J. Doyle, Watertown, and Fred A. Butler, Newton Center, Mass.

Application October 28, 1936, Serial No. 107,990

2 Claims. (Cl. 184—7)

This invention relates to the lubrication of the hub flanges of locomotive wheels and to oil distributing means for supplying substantially equal amounts of oil to a plurality of hub faces from a single lubricant pump.

In a locomotive the axles and particularly the main axles are permitted to certain freedom of axial movement to enable the locomotive to pass around the curves of the track, the amount of axial movement being restricted by engagement of the hub of one or the other of the two wheels on the axle with a bearing or thrust flange on the axle box. When the locomotive is travelling over a straight section of track the hub faces may be free from engagement with the box bearing flanges. When, however, the locomotive passes over a curved section of the track the hub faces, on one side or the other of the locomotive, are in rotating engagement with the bearing box flanges. These flanges are provided with bearing material or liners against which the wheel hub faces bear. The pressure between the hub faces and the liners is high especially at high locomotive speeds and the hub faces and the liners are in more or less constant rubbing engagement especially with locomotives on lines traversing hilly or mountainous country where the track consist largely of curved sections.

The lubrication of the engaging faces of the wheel hubs and the liners has been a difficult problem up to the present invention. Notwithstanding the fact that the problem has engaged the attention of engineers and inventors and that various lubricating systems have been proposed heretofore, it has been the common and most satisfactory practice, up to the present invention, for the locomotive engineer when at a station stop to squirt oil upon the faces of the hubs and the liners. This oil, however, almost immediately disappears by running off the faces and by being thrown off by centrifugal action and hence the faces are dry for the greater part of the time that the locomotive in is motion. Thus the faces are dry when they come into engagement and consequently rapid wear of the liners and heating of the bearing boxes is experienced. Many cases of overheating of the axle journals are caused by the heating of the box due to the heat generated between the dry faces of the wheel hub and the liner. While the liners are purposely made thick they are worn rapidly and when the free axial movement of the axle becomes unduly great the locomotive has to be sent to the shop and the wheels dropped down to permit removal of the boxes and new liners cast onto the flanges of the box and the faces trued and the boxes and the axles replaced on the locomotive. Thus the replacement of the liners is a long and tedious job and is expensive, the cost being somewhere around eight hundred dollars per locomotive. During this period the locomotive is out of service.

With the former hand method of lubrication, as above described, only from 18,000 to 22,000 miles of service was about the best that could be obtained from the liners before the locomotive had to be sent to the shop for new liners. With the liners lubricated in accordance with the present invention a locomotive has operated 60,165 miles before being sent to the shop for new liners. A number of locomotives, later equipped for liner lubrication in accordance with the present invention, have had, up to the present time, between 30,000 and 40,000 miles of service with the liners in good shape for much further service.

Hence an object of the present invention is an improved means for lubricating the hub liners of locomotives to extend the useful life thereof.

It is a further object of the invention to lubricate the hub liners in an improved manner from the usual mechanical lubricator with which the locomotive is equipped for lubricating the engine elements and other parts of the locomotive so that the lubrication of the hub liners is effected automatically and lubrication is supplied only when the locomotive is in motion, and which supplies the lubricant automatically without attention on the part of the locomotive attendants and which cannot be readily tampered with or the adjustments changed by the attendants.

It is also an object of the invention to supply oil in an improved manner to all of the hub liners of the locomotive through a common feed pipe from a single one of the pump elements of the lubricator since the amount of oil needed for each liner is relatively small provided the oil is efficiently applied and is present whenever needed.

It has been proposed heretofore to lubricate certain of the hub liners of a locomotive from a common pipe or duct supplied with oil from a pump element of a mechanical locomotive lubricator and to obtain the same amount of oil supply to each liner by flow-adjusting needle valves interposed between the common pipe and the branch pipes leading to the liners. It is obviously highly important to supply all the liners with equal amounts of oil, otherwise one or more hub liners will receive less oil than others and will wear quicker and oil will be wasted at the other liners at times when the wheel hub faces are not engaged with them. The amount of oil required is very small. With the present invention a freight locomotive of the class A–1A, with the lubricator pump piston working at full stroke, operates 360 miles on a gallon of lubricant for eight bearing boxes, or 2.8 miles per ounce of lubricant. A passenger locomotive of the class J–2B, with the lubricator pump working at full stroke, operates 665 miles per gallon for six boxes, or 5.2 miles per ounce. For each box the freight locomotive thus operates 2.8 miles for ⅛ ounce of lubricant, and the passenger locomotive 5.2 miles for ⅛ ounce of lubricant. This amount of oil per box provides sufficient lubrication since tests have shown that the liner mileage is about tripled over what has been obtained heretofore so far as is known. This insignificant amount of oil per box cannot be controlled by any known form of needle valve in such manner that all hub liners will receive approximately equal amounts of oil. When it is attempted to control the flow of such small amounts of oil by needle valves it is the experience that if one valve is opened slightly more than the others most of the oil will flow through that valve so that the hub liners associated with all the other valves will be starved for oil. Furthermore, if the valves after laborious trial are all set to pass approximately equal quantities of oil this adjustment cannot be maintained since the slightest particle of dirt in the oil as, for instance, a fine fibre lodged in the minute valve opening, changes the flow through the valve. Hence an object of the present invention is the provision of improved means for obtaining the delivery of approximately equal amounts of oil to all the hub liners of the locomotive that are connected to the lubricating system from a common feed pipe without the use of valves.

A further object of the invention is an oil distributor comprising a duct receiving oil from a suitable pressure source, the duct having a plurality of outlets and a porous resilient compressible plug, as a felt disc, being interposed between the duct and each outlet, the felt discs or plates being substantially identical as to thickness, density and fibre characteristics, and all discs being compressed substantially the same amount so that all discs have substantially the same ability to pass oil therethrough. By reason of the felt discs the duct and outlet openings can be large and yet the flow of oil through the discs can be small. Since each disc is substantially identical with all others the flow of oil through all discs is the same.

Another object is an oil lubricating system involving an oil distributor including a porous elastic and compressible oil-absorbent plug or disc through which the oil passes in controlled amounts, together with an oil pump or the equivalent that supplies oil under pulsating pressure to the distributor and, by reason of the pulsating oil pressure, alternately compresses and permits the expansion of the elastic plug, thereby at each pressure wave squeezing oil out of the plug and into the delivery duct.

A further object is generally to improve the construction and operation of lubricating devices and systems.

Fig. 1 is a plan view of the main axles and bearing boxes of a locomotive, the hub liners of which are equipped with the lubricating system embodying the present invention.

Fig. 2 is a section taken along line 2—2 of Fig. 1.

Fig. 3 is a section taken along line 3—3 of Fig. 1.

Fig. 4 is a section taken along line 4—4 of Fig. 3.

Fig. 5 is an enlarged section taken along line 5—5 of Fig. 4.

Fig. 6 is an enlarged sectional detail of a distributor of Fig. 1.

Fig. 7 is a plan view of an inner felt supporting plate.

Fig. 8 is a plan view of the felt disc.

Fig. 9 is a view of an outer felt supporting plate.

Fig. 10 is a sectional detail through the mechanical lubricator.

As herein shown the invention is applied to the main or driving axles 10 of a locomotive. Each axle is provided with a pair of wheels 12 and is journalled in bearing boxes 14. The boxes are between the wheels and are located between the jaws or pedestals 16 of the frame 18, Figs. 2 and 4, and are free for vertical movement between said jaws, the boxes having sets of confronting flanges 20 that overlie the opposite sides of the jaws to hold the boxes against axial displacement in the frame.

The outer ends of the boxes are provided with circular thrust flanges 22 each of which on its outer face carries a hub liner 24 that is adapted to be engaged with the radial face of the hub 26 of the associated wheel and to receive the axial thrust of the wheel. The hub liners usually are cast on the face of the flange 22 and usually are dovetailed thereto as indicated at 28, or the liner is otherwise secured non-rotatably to the box. The liner is of substantial thickness so that it can receive considerable wear before the amount of axial movement of the axle becomes unduly large. Under normal conditions, as with new liners 24, some axial movement of the axle is permitted so that when the locomotive is travelling along a straight track there may be a substantial clearance space 30 between the face of each liner and the confronting face of the hub, the clearance space, with new liners, being around the order of one-quarter of an inch.

In accordance with the present invention a lubricant, preferably valve oil, such as what is generally known as 600 W oil, taken from the supply of oil that lubricates the valve mechanism and other engine elements of the locomotive, is supplied to the bearing faces of the liners of all the bearing boxes. For this purpose a common header 32, suitably a relatively small iron pipe, is extended lengthwise of the locomotive above the axles and between the boxes and supported by the frame 18 and is connected by a copper tube 34 to the outlet 36 of one of the pump elements of the mechanical locomotive luricator 38 disposed at the forward end of the locomotive. Said lubricator can be of any common or desirable type such, for instance, as the "Nathan" lubricator having a plurality of independently reciprocating pump elements each supplying a separate oil outlet having a reservoir for the oil that is pumped by the pump elements. A lubricator of this type is illustrated in Fig. 10. It comprises a casing having a plurality of single-acting variable-stroke pistons 39, but one being here illustrated, each discharging oil through a separate outlet 40 and reciprocated by an oscillating shaft 40a from a rotating shaft 40b actuated through pawl and ratchet mechanism by the reciprocating driving member 40c.

The lubricator operates to deliver oil into the header 32 only when the locomotive is moving, which is the only time that the hub liners require lubrication. A plurality of oil distributors 42 which are or can be identical in construction are interposed at intervals in the header 32, each distributor being above and adjacent a separate axle and supplying oil to the hub liners of the bearing boxes for said axle. Each distributor has a depending lug 43, see Fig. 2, by which the header system is attached to the frame 18. The header projects beyond the last or rearmost distributor 42 for a short distance as at 32a where the end is closed by a cap 44. The closed projecting part 32a forms a storage chamber in which any air and sediment that may be in the header can collect. Ordinarily, however, in starting up the system the cap 44 is removed and the header 42 forced full of oil until the oil flows out of the end of the part 32a so as to sweep out any air and also sediment that may be in the pipe. The cap 44 is then placed on the pipe. The storage chamber is convenient but not essential.

The distributor 42, see especially Fig. 6, comprises a casing 46 having a middle oil passage 48 therethrough and opposed necks 50 into which the ends of the sections of the header 32 can be screw-threaded so as to provide a free oil passage through the casing from one header section to another. The casing between the necks 50 is provided with a pair of opposed outwardly projecting cylinders or bosses 52 which have internal cylindrical bores or recesses 54 therein open at the outer ends of the bosses. Each of the bosses is traversed by a bottom wall 56 which has a relatively large opening 58 therethrough which provides communication between the central passage 48 and the cylindrical bore 54. A perforated strainer and plug supporting plate 60 is located in the bottom of each bore 54 upon the bottom wall 56 and is provided with a plurality of relatively small passages or perforations 62 therethrough which overlie the opening 58 in the bottom wall. A porous elastic oil-absorbent disc or plug 64 having a diameter substantially conformed with that of the cylindrical bore 54 and in good contact therewith is seated upon the perforated plate 60. Said plug preferably is a felt disc and is approximately one and one-quarter inch in diameter and is cut from a felt sheet approximately one-half an inch thick and having a wool content of approximately 85% and weighing approximately seven ounces per square foot. Thus the discs are resilient and can be compressed without matting and will spring back when the compression pressure is reduced. Preferably the disc is made from a felt composed of new wool, rather than reclaimed wool. A new wool felt has longer fibres and hence the disc is more elastic than a disc of reclaimed wool felt. A new wool felt usually has finer fibres and hence the pores are smaller and the discs more uniform in porosity than a reclaimed wool felt. The discs of all the distributors are as nearly identical as is practicable; and felt sheets can be made that are closely uniform in density, porosity and thickness. Above each felt disc 64 is an apertured retaining disc or plate 66 which is provided in the middle portion thereof with relatively large passages or perforations 68 therethrough, the disc 66 here shown having three segmental passages 60 separated by radial ribs 70. A cylindrical gland 72 having a flat bottom face 74 is located within the cylindrical bore 54 and bears upon the top face of the upper disc 66. The gland has a passage 76 therethrough that is substantially equal in diameter to the circumscribing diameter of the passages in the disc 66. The gland is held in position by engagement with a coupling cap 78. Said cap is provided with an inner face 80 that is seated upon the ends of both the boss 52 and the gland 72 and is provided with internal screw threads 84 that mesh with the external screw-threads 86 of the boss 52. The depth of the cylindrical bores 54 of each coupling is the same within close limits and the length of the glands 76 is also held to a common dimension within close limits. Thus the felt discs 64 are compressed equally and hence the oil flow through them must be approximately the same. The glands when resting upon the tops of the retaining plates, without pressure thereon, project outwardly beyond the ends of the bosses to such an extent that when the caps are screwed home the felts are compressed about 25%. The amount of compression is not critical but should be sufficient to nullify, more or less completely, the effect of small irregularities of thickness of the discs and hold them securely located in place with the upper and lower metal discs 66 and 60 in engagement therewith. At the same time, the amount of compression should not be so great as to prevent the discs from being responsive to the pulsating oil pressure. It is quite important, however, that the amount of compression of the discs should be closely the same in order to secure substantially equal oil flow through all the discs. It will be appreciated that while the discs in themselves are closely uniform the flow through one disc may be changed by compressing it to a different degree than another disc.

While the cross sectional area of any one oil passage through the disc is minute there are a multitude of such passages and hence the blockage of many such passages by sediment or the like will not harmfully affect the flow of oil therethrough. Furthermore, the blocking of several of the perforations 62 of the disc 60 will not reduce the flow of oil. The compression and expansion of the disc in response to the pulsating oil pressure further tends to keep the passage open. Thus the distributor is practically immune from stoppage due to foreign matter in the oil.

Each coupling cap 78 is provided with an exteriorly screw-threaded neck 88 having an oil outlet passage 90 therein. Each neck is detachably connected to a flexible conductor 92, the end of the conductor having a conically ended coupling member 94 secured thereto and held seated in the conical recess 96 of the neck 88 by a collar 98 that is screw-threaded removably on the screw threads of the neck. The flexible conductors 92 of each distributor lead downwardly to a separate bearing box of a common axle so that the oil runs from the distributor to the box by gravity.

The bearing box is provided with an upstanding nipple 100 which is screw-threaded in an oil duct 102 in the bearing box and hub liner, the duct having an enlarged discharge opening 104 that is open in the bearing face of the liner so that oil in the duct can run freely onto the bearing face of the liner and onto the face of the wheel hub in contact therewith. The opening 104 is preferably located as close to the inner edge of the thrust receiving face and as far below the top of the liner as is practicable, as illustrated in Fig. 3, and on the rear side of the axial line of the axle, that is to say, on the left hand side of the axis of the liner, as viewed in Fig. 3, with the axle rotating clockwise for the normal forward motion of the locomotive. With this arrangement the oil is carried around the face of the hub liner during the rotation of the wheel hub in engagement therewith and also is carried outwardly so that lubrication of the full face of the liner and wheel hub is obtained.

The nipple 100 is connected detachably to the flexible conductor 92 by a coupling 106. The boxes can be disconnected from the lubricating system when it is necessary to drop the boxes and wheels by simply unscrewing the couplings 106. The conductors 92 being flexible are not liable to breakage due to vibration set up by the movement of the locomotive. The oil in the conductors 92 is not under pressure since the discharge capacity of the flexible conductor is greater than that of a disc, and the oil can flow freely through and out of the flexible conductor. Hence stress on the flexible conductors due to pressure therein is entirely absent.

The system has been found to be highly satisfactory in operation and as above stated a liner life of 60,000 miles has been obtained with an oil consumption of a gallon of oil for from 360 to 665 miles dependent upon the class of locomotive. An increase of viscosity of the oil due to operation under winter conditions does not appear to effect the operation of the system.

It will be appreciated that the amount of oil that is fed to a single liner per mile or per unit of time is exceedingly small. This oil is passed through the felt disc or plug 64 of the distributor by the combined effect of the hydrostatic pressure of the oil and by the compression of the felt plug at each stroke of the pump piston 39. The pump is single acting so that it delivers oil into the header when moving in one direction but not when moving in the reverse direction. Hence the pressure in the header is pulsating. This pressure is exerted on one face of the felt plug and hence compresses it. The plug being in constant contact with the oil is saturated with oil. The compression of the plug by the intermittent oil pressure reduces the volume of the oil spaces within the plug and hence squeezes oil out of the plug into the flexible conductor, from which the oil runs downwardly to the liner. When the pump piston makes its return stroke the oil pressure on the disc becomes reduced and the disc expands by reason of its inherent resiliency and absorbs additional oil. The pressure in the header, when supplying the hub liners of the four axles of the locomotive, is not high being usually around eight pounds which is sufficient to cause a substantial compression of the felt. In tests on the lubricating system, where the mechanical lubricator was replaced by an elevated tank giving the same gage pressure in the distributor header as with the lubricator, no oil was discharged through the felt plugs.

With the lubricating system of the present invention the oil flow through all plugs is very closely the same and is approximately indefinitely constant, as has been determined by experience.

We claim:

1. A lubricating system comprising a single action oil pump for supplying oil continuously to said duct under pulsating pressure, an oil outlet leading from said duct, and an oil absorbent plug interposed between said outlet and said duct and in contact with the oil in said duct, said plug being compressible by the pressure of oil in said duct and capable of compression and expansion in response to the pulsating oil pressure in said duct to pass oil through the plug on each increase of oil pressure, the plug being characterized by being largely oil impervious to a steady oil pressure.

2. A lubricating system for the hub liners of locomotives having wheeled axles, bearing boxes supporting the axles and hub liners on the bearing boxes, said system comprising, in combination with the aforesaid elements, an oil header extended lengthwise of the locomotive above and across the axles, a mechanical lubricator common to the locomotive and operative in response to the movement thereof and having a reciprocating pump element connected with said header for supplying successive charges of oil thereto at pulsating pressures, a plurality of oil distributors interposed in said header, each distributor being disposed above and adjacent to a separate axle, said distributors each having a header oil passage therethrough and a pair of oil outlets, large-diameter thick compressible felt flow-equalizing plugs interposed between each of said outlets and said oil passage and in contact with the oil in said passage, and flexible conductors extended downwardly from said outlets to said liners to feed oil from said plugs by gravity to said liners and having detachable connections with said bearing boxes, the oil passages from said headers through said plugs to the liners being open at all times, said felt plugs being compressible under oil pressure to expel oil therefrom to flow to said hub liners and expansible between pressure pulses to absorb oil from said header, said felt plugs being largely oil impervious to a steady oil pressure.

EDWARD J. DOYLE.
FRED A. BUTLER.